United States Patent [19]

Ikemoto et al.

[11] 4,448,089
[45] May 15, 1984

[54] LUBRICATING DEVICE FOR CHANGE-SPEED GEARING UNITS

[75] Inventors: Kazuhito Ikemoto; Nobuaki Katayama; Yukio Terakura, all of Toyota; Kan Sasaki, Shiratori, all of Japan

[73] Assignee: Toyota Jidosha Kogyo Kabushiki Kaisha, Aichi, Japan

[21] Appl. No.: 240,330

[22] Filed: Mar. 4, 1981

[30] Foreign Application Priority Data

Aug. 20, 1980 [JP] Japan .................... 55-117922[U]

[51] Int. Cl.³ .................... F16H 57/04; F01M 9/00
[52] U.S. Cl. .................... 74/467; 184/6.12
[58] Field of Search .................... 74/467; 184/6.12

[56] References Cited

U.S. PATENT DOCUMENTS

| | | | |
|---|---|---|---|
| 1,220,810 | 3/1917 | Alquist | 74/467 |
| 1,220,811 | 3/1917 | Alquist | 74/467 |
| 3,529,698 | 9/1970 | Nelson | 184/6.12 |
| 4,090,748 | 5/1978 | Sugimoto et al. | 74/467 |
| 4,319,499 | 3/1982 | Sanui et al. | 74/467 |
| 4,329,887 | 5/1982 | Kawamoto | 74/467 |
| 4,348,914 | 9/1982 | Kawamoto | 74/467 |

FOREIGN PATENT DOCUMENTS

| | | | |
|---|---|---|---|
| 51-47698 | 8/1976 | Japan . | |
| 54-55261 | 5/1979 | Japan | 74/467 |

Primary Examiner—Lawrence J. Staab
Assistant Examiner—Michael David Bednarek
Attorney, Agent, or Firm—Armstrong, Nikaido, Marmelstein & Kubovcik

[57] ABSTRACT

In a change-speed gearing unit including an extension housing formed at its rear end portion with an upright projection located in the upper opening of the housing, and a shift-and-select lever shaft slidably and rotatably supported at its rear end portion by an axial bearing hole in the upright projection, a lubricating device comprises a pair of laterally upright walls formed on the rear end portion of the housing between both faces of the upright projection and both opposed inner walls of the upper opening portion of the housing to form an oil well in open communication with the axial bearing hole, the oil well being supplied with lubricating oil picked up by the rearmost gears of the change-speed gearing unit.

6 Claims, 7 Drawing Figures

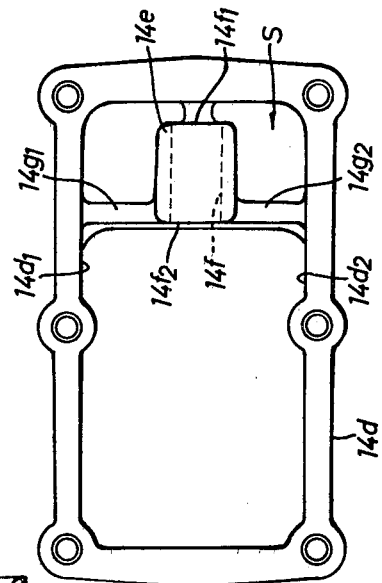
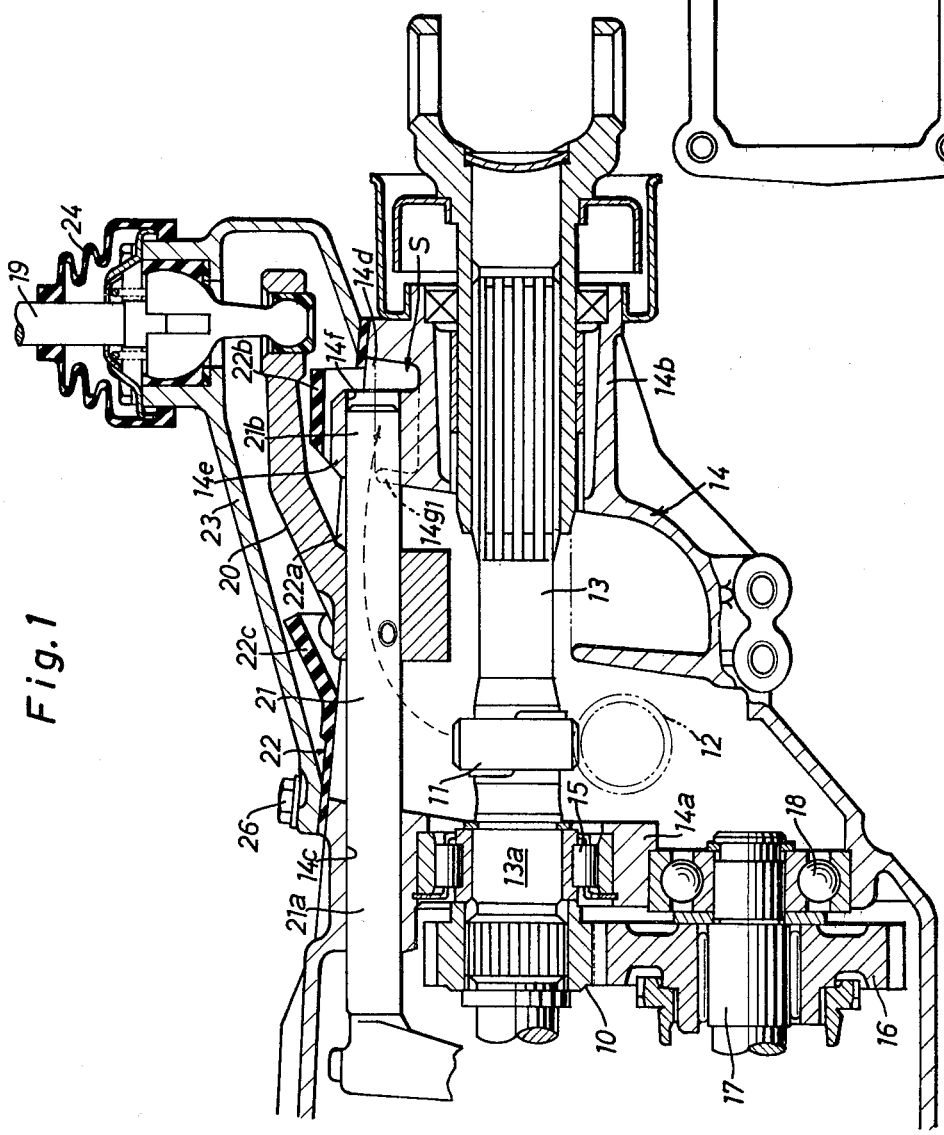

1

LUBRICATING DEVICE FOR CHANGE-SPEED GEARING UNITS

BACKGROUND OF THE INVENTION

The present invention relates generally to change-speed gearing units for motor vehicles, and more particularly be a lubricating device for such change-speed gearing units.

Change-speed gearing units are known of the type in which an extension housing secured to a transmission housing is formed at its rear end portion with an upright projection located in the upper opening of the extension housing and in which a shift-and-select lever shaft is axially slidably supported by an axial bearing hole of the upright projection at its rear end portion. In such a change-speed gearing unit of the type described above, the rearmost gears on the output shaft are located at the front portion of the extension housing to avoid direct flow of lubricating oil through the upper opening of the extension housing caused by rotation of the gears, while the upright projection is spaced from the rearmost gears. In this way, the rear sliding portion of the shift-and-select lever shaft can not be splashed with the lubricating oil picked up by the rearmost gears. It is, therefore, necessary positively to lubricate the rear sliding portion of the lever shaft so as to ensure durability of the change-speed gearing unit.

SUMMARY OF THE INVENTION

A primary object of the present invention is to provide, in a simple construction, a lubricating device for a change-speed gearing unit capable of sufficiently lubricating the rear sliding portion of the shift-and-select lever shaft.

According to the present invention briefly summarized, the primary object is accomplished by provision of a lubricating device for a change-speed gearing unit in which an extension housing is formed at its rear end portion with an upright projection located in the upper opening of the housing and in which a shaft is slidably and rotatably supported by an axial bearing hole in the upright projection at the rear end portion thereof. The lubricating device comprises a pair of laterally upright walls formed on the rear end portion of the housing between both faces of the upright projection and both opposed inner walls of the upper opening portion of the housing to form an oil well in open communication with the axial bearing hole of the upright projection, the oil well being supplied with lubricating oil picked up by the rearmost gears of the change-speed gearing unit.

BRIEF DESCRIPTION OF THE DRAWINGS

Additional objects and advantages of the present invention will be more readily apparent from the following detailed description of a preferred embodiment thereof when taken together with the accompanying drawings in which:

FIG. 1 is a sectional view showing the rear interior of a change-speed gearing unit;

FIG. 2 is a plan view of the upper opening portion of the extension housing shown in FIG. 1;

DESCRIPTION OF THE PREFERRED EMBODIMENT

Figure 3:
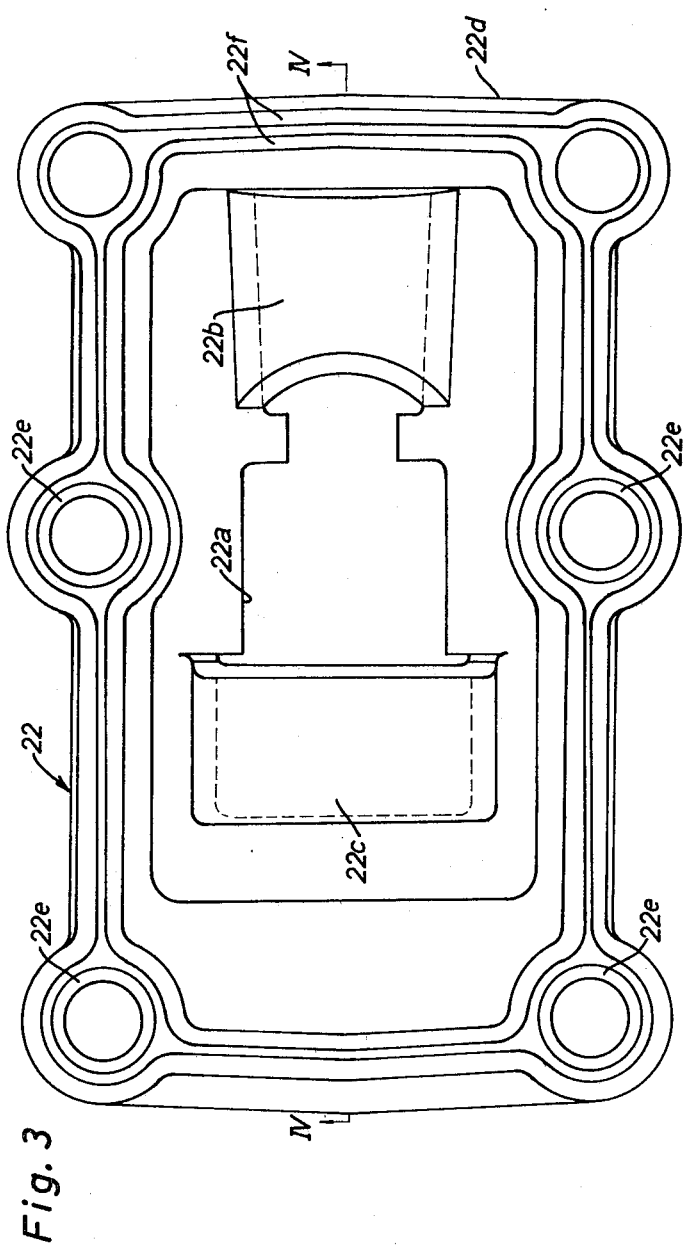
FIG. 3 is a plan view of an oil buffer member attached to the upper seating face of the extension housing shown in FIG. 1.
Figure 4:
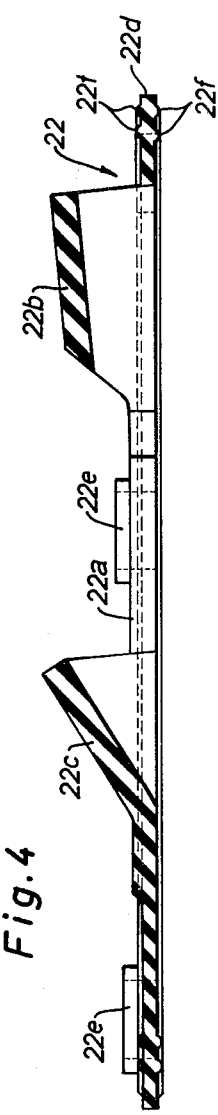
FIG. 4 is a sectional view taken along line IV—IV in FIG. 3.
Figure 5:
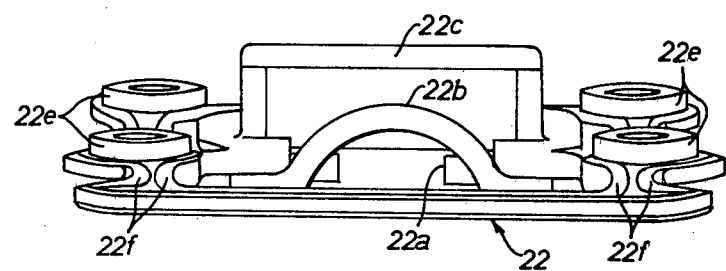
FIG. 5 is a front view of the buffer member.

Referring now to the drawings, FIG. 1 illustrates the rear interior of a change-speed gearing unit of the direct-operation type, in which an output shaft 13 extends in an axial direction through the interior of an extension housing 14 secured in a fluid-tight manner to a transmission casing (not shown) for the unit. The output shaft 13 is rotatably supported at its intermediate portion $13a$ by means of a bearing 15 carried in an upright partition wall $14a$ of housing 14. The output shaft 13 is provided thereon with a fifth-speed driven gear 10 splined on output shaft 13 and a speedometer drive gear 11 fixed to output shaft 13 and in mesh with a speedometer driven gear 12. In addition, the rear end portion of output shaft 13 is rotatably supported in a usual manner from the rear end portion $14b$ of housing 14 and extends outwardly from housing 14. A counter-gear shaft 17 is arranged in parallel with output shaft 13 and is rotatably supported by a bearing 18 carried in partition wall $14a$. A fifth-speed drive gear 16 is freely rotatable on counter-gear shaft 17 and permanently in mesh with the driven gear 10 to complete a fifth-speed gear train when engaged with counter-gear shaft 17.

Arranged within the rear interior of the gearing unit is a shift-and-select lever shaft 21 which may be rotated or axially shifted by a shift lever 19 by way of a shift-lever housing 20. The lever shaft 21 is axially slidably supported at its front portion $21a$ by an axial bearing hole $14c$ in the upper portion of partition wall $14a$ and at its rear end $21b$ by an axial bearing hole $14f$ formed in an upright projection $14e$. The upright projection $14e$ is integrally formed on the rear end portion $14b$ of housing 14 and is located within the upper opening portion $14d$ of housing 14 on which portion a shift-lever retainer casing 23 is secured by way of an oil buffer or interseptum member 22 of elastic material such as synthetic rubber to close the upper opening of housing 14. The shift lever 19 is mounted at its lower end on the retainer casing 23 in such a way as to be selectively tilted in the fore and aft directions and in the left and right directions, and it is covered at its leg portion by a rubber boot 24 coupled over the retainer casing 23.

As can be well seen in FIGS. 1 and 2, a pair of laterally upright walls $14g_1$ and $14g_2$ are integrally formed on the rear end portion $14b$ of housing 14 between both faces of upright projection $14e$ and both opposed inner walls $14d_1$ and $14d_2$ of upper opening portion $14d$ to form an oil well S is open communication with the rear opening $14f_1$ of axial bearing hole $14f$. With this construction, lubricating oil picked up by speedometer gears 11 and 12 flows into the oil well S during operation of the change-speed gearing, and the stored lubricating oil in well S flows through axial bearing hole $14f$ from its rear opening $14f_1$ to lubricate the rear sliding portion $21b$ of shift-and-select lever 21 within axial bearing hole $14f$. Subsequently, the lubricating oil drops into the interior of housing 14 from the front opening $14f_2$ of axial bearing hole $14f$. This serves to ensure sufficient lubrication of the rear sliding portion $21b$ of shaft 21 within axial bearing hole $14f$ and to ensure smooth sliding movement of shaft 21 thereby providing a good operational feel in the shifting of shift lever 19.

As can be well seen in FIGS. 1, 3, 4 and 5, the oil buffer member 22 seals at its outer periphery the rearwards inclined joint portion of housing 14 and retainer casing 23 and closes the whole upper opening portion 14d of housing 14 except for an opening 22a through which the shift-lever housing 20 extends upwardly. The buffer member 22 includes an upwardly arched portion 22b, in order to cover the head of upright projection 14e with a slight clearance, and a rearwardly and upwardly inclined portion 22c located above the leg portion of shift-lever housing 20. It is preferred that the inclined portion 22c of buffer member 22 be as closely adjacent as possible to the shift-lever housing 20 without any interference in the operation of the same. With this arrangement, the buffer member 22 serves to interrupt, for the most part, the upward flow of lubricating oil picked up by speedometer gears 11, 12 and thus prevent oil leakage from boot 24, and further serves to absorb noises from the interior of housing 14. Furthermore, a portion of the picked up lubricating oil is received and directed rearwards by the inclined portion 22c of buffer member 22 and then induced into the oil well S.

Figure 6:
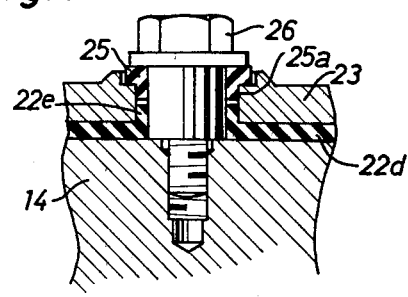
FIG. 6 depicts a cross-section of the front fixing arrangement of the retainer casing shown in FIG. 1.
Figure 7:
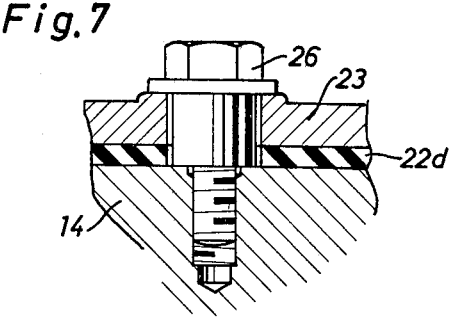
FIG. 7 depicts a cross-section of the rear fixing arrangement of the retainer casing.

In the embodiment described above, the outer peripheral portion of retainer casing 23 is fixed at four points of its front portion to the upper seating face of housing 14 as shown in FIG. 6 and is fixed also at two points of its rear portion to the upper seating face of housing 14 as shown in FIG. 7. As can be well seen in FIG. 6, at each point of the front fixed portion of the retainer casing, the buffer member 22 is integrally formed at its peripheral portion with an annular protrusion 22e which is pre-coupled within a mounting hole of retainer casing 23 with a radial press fit; and a washer-like rubber seat 25 is integrally formed with an annular protrusion 25a which is also pre-coupled within the mounting hole of retainer casing 23. In the actual practice, the annular protrusion 22e may be integrally formed with the rubber seat 25. In assembling, the retainer casing 23 is fixed at its peripheral portion by a stepped bolt 26 threaded into the upper seating face of housing 14 through the annular protrusions 22e and 25a in such a manner that the retainer casing 23 is floatably secured in place to absorb vibration transmitted thereto from housing 14.

As can be well seen in FIG. 7, the retainer casing 23 is further fixed at each point of its rear peripheral portion by a stepped bolt 26 threaded into the upper seating face of housing 14 through the outer peripheral portion 22d of buffer member 22. This serves to effectively absorb vibration acting on retainer casing 23 and to obtain smooth operational feel in the shift-and-select operation of shift lever 19. Furthermore, the rear fixing arrangement described above serves to prevent floating of the rear portion of retainer casing 23 and to enhance the durability of rubber seat 25. In case the vertical vibration acting on shift lever 19 is accelerated, the rear fixing arrangement acts to reliably restrain the floating action of shift-lever retainer casing 23 and to prevent oil leakage from the fitted portion between buffer member 22 and the upper seating face of housing 14. For inserting the buffer member 22 between retainer casing 23 and the upper seating face of housing 14, it is preferable that the outer peripheral portion 22d of buffer member 22 be formed at both its faces with two parallel ridges 22f to enhance the sealing effect between the housing 14 and retainer casing 23.

Although a certain specific embodiment of the present invention has been shown and described, it is obvious that many modifications and variations thereof are possible in light of these teachings. It is to be understood therefore that within the scope of the appended claims, the invention may be practiced otherwise than as specifically described herein.

What is claimed is:

1. In a change-speed gearing unit having an extension housing having an upper opening portion and containing therein the rearmost gears of said change-speed gearing unit and being formed at its rear end portion with an upright projection having two faces located in the upper opening of said housing, a retainer casing mounted on said housing to support a shift lever thereon, and a shift-and-select lever shaft slidably and rotatably supported at its rear end portion by an axial bearing hole in said upright projection and being operatively connected to said shift lever, a lubricating device comprising:

a pair of lateral upright walls formed on the rear end portion of said housing between both faces of said upright projection and the opposed inner walls of said upper opening portion of said housing to form an oil well in open communication with said axial bearing hole, and an oil buffer member of elastic material having an outer periphery portion interposed between said housing and said retainer casing to cover the upper opening of said housing, said buffer member being integrally formed with a rearwardly and upwardly inclined portion for receiving the lubricating oil picked up by the rearmost gears and directing it into said oil well.

2. A lubricating device as claimed in claim 1, wherein said shift-and-select lever shaft has a diameter and said lateral upright walls have a height which is less than the uppermost extended of the diameter of said shift-and-select lever shaft.

3. A lubricating device as claimed in claim 1, wherein said oil buffer member is provided as a sealing member interposed between said housing and said retainer casing.

4. A lubricating device as claimed in claim 1, wherein said oil buffer member includes an upwardly arched portion to cover the head of said upright projection with a slight clearance.

5. A lubricating device as claimed in claim 1, wherein the rearwardly and upwardly inclined portion of said oil buffer member is located above the rearmost gears of said change-speed gearing unit.

6. A lubricating device as claimed in claim 1, wherein said axial bearing hole in said upright projection is arranged to permit therethrough the flow of lubricating oil from said oil well into the interior of said housing.

* * * * *